No. 737,233. PATENTED AUG. 25, 1903.
J. B. F. HERRESHOFF.
ABSORBER FOR THE MANUFACTURE OF SULFURIC ACID.
APPLICATION FILED JUNE 12, 1902.
NO MODEL.
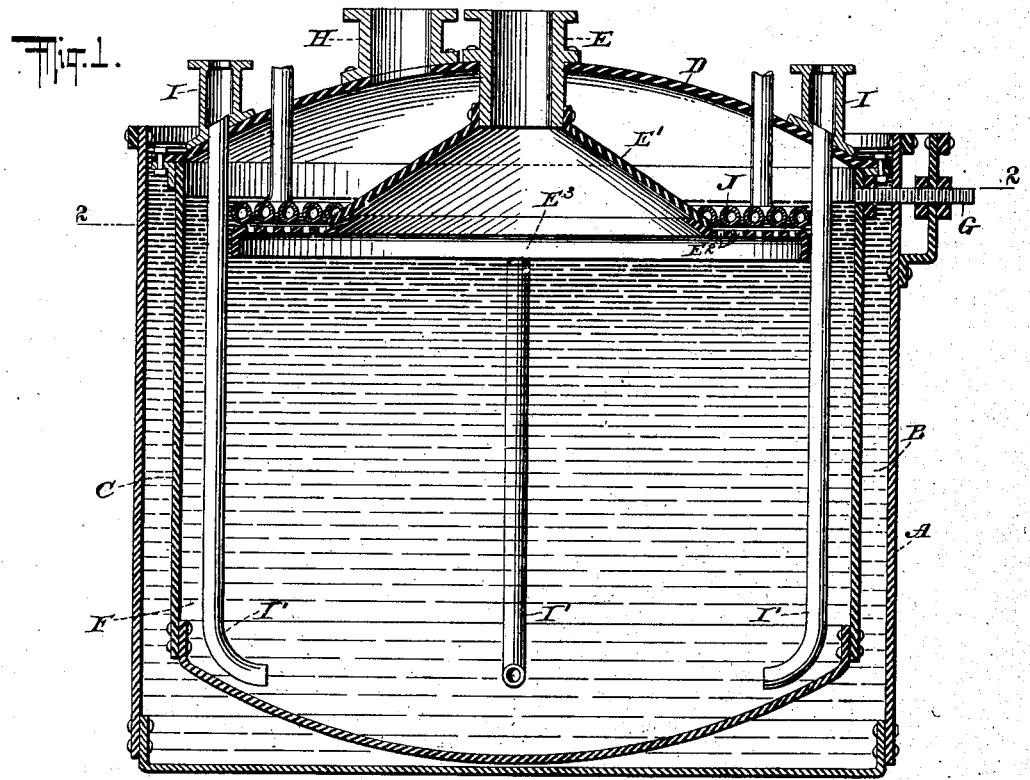
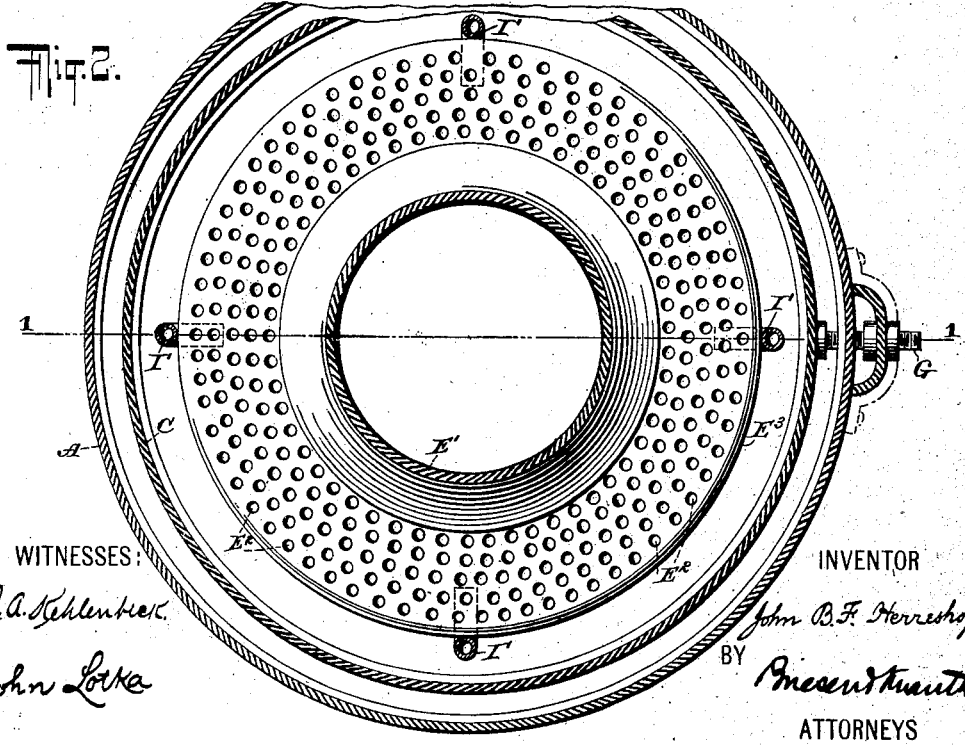
WITNESSES: INVENTOR
John B. F. Herreshoff
BY
ATTORNEYS No. 737,233.

Patented August 25, 1903.

UNITED STATES PATENT OFFICE.

JOHN B. F. HERRESHOFF, OF NEW YORK, N. Y., ASSIGNOR TO GENERAL CHEMICAL COMPANY, OF NEW YORK, N. Y., A CORPORATION OF NEW YORK.

ABSORBER FOR THE MANUFACTURE OF SULFURIC ACID.

SPECIFICATION forming part of Letters Patent No. 737,233, dated August 25, 1903.

Application filed June 12, 1902. Serial No. 111,271. (No model.)

*To all whom it may concern:*

Be it known that I, JOHN B. F. HERRESHOFF, a citizen of the United States, residing in the borough of Manhattan, city, county, and State of New York, have invented certain new and useful Improvements in Absorbers for the Manufacture of Sulfuric Acid, of which the following is a specification.

My invention relates to apparatus used in the manufacture of sulfuric acid by causing a mixture containing sulfuric anhydrid to be absorbed by a body of liquid acid.

The object of my present invention is to provide an apparatus of the above-indicated class which effects a thorough distribution of the anhydrid or of the gaseous mixture containing the same in the liquid acid used for absorbing the anhydrid, in which, further, the body of liquid will be kept in continuous motion, so as to bring, as far as possible, constantly renewed portions of liquid in contact with the anhydrid.

A specific example of an absorber embodying my present invention is shown in the accompanying drawings, in which—

Figure 1 is a sectional elevation of such apparatus on line 1 1 of Fig. 2, and Fig. 2 is a sectional plan thereof on line 2 2 of Fig. 1.

The apparatus illustrated in the drawings comprises an outer receptacle A, adapted to contain a body B, of water or other fluid, and also the absorber proper, C, which is generally made of iron and has a curved bottom resting on that of the outer receptacle A. The top D of the absorber proper is provided with an inlet E, preferably located at the center and continued downward by a gradual widening conical portion E', at the bottom of which is located an outwardly-extending perforated plate $E^2$, having at its outer edge a depending rim or flange $E^3$, which is preferably imperforate. This rim $E^3$, together with the plate $E^2$ and with a portion of the conical section E', is adapted to be immersed in a body of liquid acid F, the level of which is governed by an overflow G, which extends through the absorber C and through the outer receptacle A. Submerged in the acid above the plate $E^2$ is a coil J, through which a cooling medium may be circulated. At a suitable portion of the top D is located an outlet H for the unabsorbed gaseous products. I further provide inlets I, of which I have shown four, although even one may be sufficient, and these inlets are connected with pipes I', extending near to the bottom of the absorber C, and preferably having their lower ends curved inwardly, as shown in Fig. 1.

In operation I first fill the absorber C with a body of liquid F, preferably sulfuric acid of the same strength as that which it is desired to produce, and I have found that a strength from ninety-seven to ninety-nine per cent. offers special advantages, for the reason that acid of this strength has only a very slight action on iron and for the further reason that acid of this strength has a very great power of absorbing sulfuric anhydrid. Acid of twenty-seven per cent. free anhydrid or more may also be used. The gases which are admitted through the inlet E generally contain about six parts of sulfuric anhydrid, six parts of oxygen, and eighty-eight parts of nitrogen. This mixture passes into the concentrated acid and is forced therethrough either by suction or by pressure passing first to the bottom of the funnel-shaped portion E' and then outwardly to the perforated plate $E^2$. The gases then rise through the perforations of the plate, being thus divided into a great number of small jets, so as not only to bring the gas into better contact with the liquid, but, further, to exert a stirring action on the liquid, so as to keep it in continuous motion and bring fresh portions of the acid in contact with the anhydrid. The heat due to the absorption is largely or entirely eliminated by the action of the cooling-coil J. Normally the absorption of the anhydrid would, of course, increase the strength of the acid, and when this is not desired on account of the detrimental effect on the iron and for commercial reasons I introduce simultaneously with the sulphuric anhydrid a diluting agent in sufficient quantity to keep the body of liquid acid at its original degree of concentration. This diluting agent is introduced through the pipes I' and may consist, for instance, of steam, water, or weak acid—say acid of eighty-eight to ninety-five per cent.

in case acid of ninety-seven to ninety-nine per cent. is to be produced. Inasmuch as this weak and therefore relatively light acid is introduced at the bottom, and, further, owing to the fact that the weak acid is discharged toward the center, the acid-jets will have a tendency to travel toward the center and at the same time toward the top, thereby contributing to keep the entire mass of the liquid in continuous motion, so that the concentration of the acid will be practically the same in all the portions thereof.

While I have described the use of my improved apparatus in connection with a certain mode of procedure which I believe to be particularly advantageous, I wish it to be understood that the apparatus is capable of being used in other ways, and certain features of the improvement are capable of employment independently of others without entirely sacrificing the advantages of my invention.

Therefore, what I claim, and desire to secure by Letters Patent, is—

1. An absorber for gaseous substances comprising a receptacle having an inlet with a funnel-shaped enlargement and an annular perforated plate extending outwardly from said enlargement at its lower end, and an outlet or overflow for keeping the level of the liquid contained in said receptacle above the said plate, so that the latter will be immersed in the liquid.

2. An absorber for gaseous substances, comprising a receptacle provided with an inlet and a gas-distributer connected therewith, means for keeping the level of the liquid above the said distributer, and a cooling device located within the receptacle, in contact with the liquid, above the level of the distributer.

3. An absorber for gaseous substances comprising a receptacle provided with an inlet, a funnel-shaped enlargement extending downwardly from the inlet, an annular perforated plate extending outwardly from the lower edge of said enlargement, a rim depending from the outer edge of said plate, and means for keeping the level of the liquid in said receptacle above the said perforated plate.

4. An absorber for gaseous substances comprising a receptacle provided with an inlet for the gas to be absorbed, and with an overflow governing the level of the liquid contained in the receptacle, a gas-distributing device connected with the inlet and located below the level of the liquid, and tubes for admitting a diluting agent at the lower part of the liquid, said tubes having their discharge ends directed inwardly.

5. An absorber for gaseous substances comprising a receptacle provided with an inlet, a perforated plate connected with said inlet, means for keeping the level of the liquid in said receptacle above the perforated plate, and a cooling device arranged above said plate.

In testimony whereof I have signed my name to this specification in the presence of two subscribing witnesses.

JOHN B. F. HERRESHOFF.

Witnesses:
  JOHN LOTKA,
  EUGENE EBLE.